Figure 1:
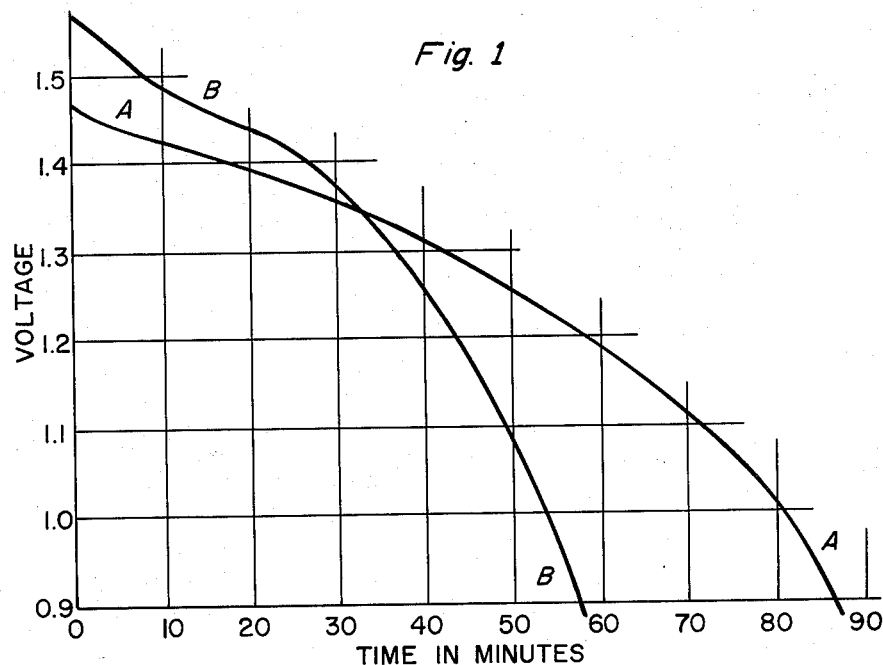

Dec. 29, 1964 W. B. HARDY ETAL 3,163,561
DRY CELL WITH BENZOFUROXAN COMPOUND DEPOLARIZER
Filed Aug. 15, 1961 2 Sheets-Sheet 1

INVENTORS.
WILLIAM B. HARDY.
RICHARD A. PARENT.

INVENTORS.
WILLIAM B. HARDY.
RICHARD A. PARENT.

United States Patent Office 3,163,561
Patented Dec. 29, 1964

---

3,163,561
DRY CELL WITH BENZOFUROXAN COMPOUND DEPOLARIZER
William B. Hardy, Bound Brook, and Richard A. Parent, Somerville, N.J., assignors to American Cyanamid Company, New York, N.Y., a corporation of Maine
Filed Aug. 15, 1961, Ser. No. 131,661
8 Claims. (Cl. 136—137)

This invention relates to improved battery compositions for dry cells. More particularly, it is concerned with a new group of depolarizing agents and with improved cathodic mixes containing the same and dry cells manufactured therewith.

Still more specifically, the novel depolarizing agents comprise furoxan derivatives represented by the formula

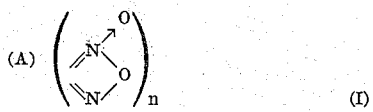

wherein (A) represents a six-membered carbocyclic ring system, the two nitrogens of each furoxan residue being attached to adjacent carbons of the six-membered ring system; and "$n$" is 1 to 3. (A) may contain additional substituents when "$n$" is 1 to 2 as exemplified by the structures

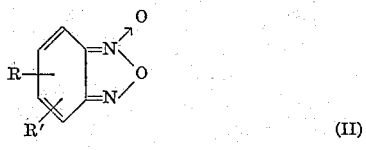

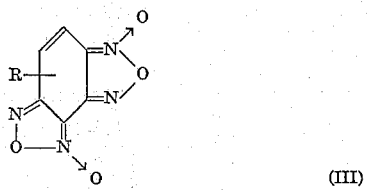

wherein R and R' are hydrogen, lower alkyl, lower alkoxy, chloro and nitro radicals. When "$n$" is 3 the illustrative compound benzotrifuroxan has the structure

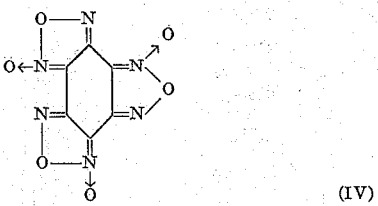

Dry cells in general are composed of the following elements: an anode, usually in the form of a cup made from a metal high in the electro-motive series, such as zinc, magnesium and alloys thereof; a rod of carbon or other inert material to serve as a collector of electrons; a mixture of carbon and depolarizer, usually referred to as the "cathode" or "black" mix; and an electroylte, which is generally a concentrated aqueous salt solution.

The voltage of a dry cell, its life under various discharge rates, and maintenance of a satisfactory minimum voltage during a large part of its life are important factors. Therefore, a depolarizer is used. It acts to increase the life of the cell, i.e., its total power energy output. During discharge, the depolarizer also aids in maintaining a satisfactory voltage under useful current loads. Since depolarizers are also oxidizers, for many decades the standard depolarizer has been manganese dioxide. In order to obtain satisfactory distribution and conductivity, the manganese dioxide is mixed intimately with finely-divided carbon to produce the black mix which surrounds the carbon positive or collector.

While inorganic depolarizers such as manganese dioxide are operative and have been standard for many decades, they are by no means ideal. Extensive investigations have been carried out to develop better depolarizers and, as a result of these investigations, a number of organic compounds have been found which are superior to manganese dioxide. Requirements of cells vary according to use. Accordingly, different types of organic material have been proposed as depolarizers depending on whether the cell is to be used in slow drain or in fast drain systems. In addition, the optimum suitability of organic materials as depolarizers will vary with the metal or metal alloy used as anodic materials. In the past, compounds which are best suited for magnesium or magnesium alloy anodes have not been found suitable with zinc anodes.

For best performance in batteries, materials are desired which give both a high initial voltage and a flat discharge curve with time, i.e., discharge accompanied with a minium drop of voltage with time. Below a certain fixed voltage, the cell becomes unusable even though there may still be considerable energy present although not available as useful energy. In evaluating cells, a certain voltage is usually taken as a cut-off point below which the energy present is not considered available.

In evaluating cells, a common method of comparison is to note the initial voltage and then determine the time required at a particular discharge rate (which simulates the discharge in its anticipated use) to reach a certain cut-off voltage point (below which the battery becomes inoperative) which may be in the range of 0.9 to about 0.75 volt. Illustratively, a cut-off voltage of 0.9 volt may represent a practical voltage figure below which the battery ordinarily becomes inoperative with portable electronic equipment. With a flat discharge curve, a more uniform voltage is supplied over a normal period of time before the cell becomes inoperative. Thus, a practical advantage is obtained in that portable electronic equipment such as a transistor radio operates more uniformly over longer periods.

Active life of the cell is determined by its coulombic capacity, that is, the amount of current discharged before a given cut-off voltage point is reached. From discharge curves the energy output of the cell may be determined, for example, expressed as watt-hours per pound of cell to a particular voltage cut-off. Energy per unit weight is an important figure, for example in missiles for military use. Here weight and size in relation to the energy output are important factors and a lightweight cell which lasts longer in operation compared with a heavier cell is a great advantage. Naturally, to be useful the cell must show an initial voltage sufficient to operate the equipment which it is to serve. For one reason or another, previously-proposed organic depolarizers did not prove wholly satisfactory for the cells meeting these requirements.

It is, therefore, the object of the present invention to provide a type of organic material suitable for use as depolarizing agents which permits more closely meeting the several requirements of an optimum cell. In particular, it should provide compounds which are applicable for use without being as critically limited as to the type of anode metal or as to the intended drain rate.

These objects have been surprisingly well accomplished by the use of the series of furoxan derivatives defined above. They have proved excellent in performance as organic depolarizers in cathodic mixes for dry cells. Some members of this series are unique in that they are useful as depolarizers in different types of cells using different metallic anodes. Unlike many previously-proposed compounds, they are not limited to use as depolarizers in a particular type of cell such as a zinc anode cell or a magnesium or magnesium alloy cell. A distinguishing feature of the furoxan series of this invention is that they are useful with either zinc or magnesium anodes with superior results.

The highly satisfactory results obtained by using the furoxan derivatives of the present invention is quite unexpected from another point of view. Organic depolarizers found to give the best results in the past have been various nitro and nitroso derivatives. However, the new series of furoxan depolarizers includes compounds with or without nitro radicals. Thus, the superior properties of the new series of depolarizers having a different kind of heterocyclic system could not be predicated on a review of the art. It was not to be expected therefrom that compounds of a heterocyclic series of this type would be useful in both zinc and magnesium types of batteries.

In using the compounds of the invention as cathodic compounds or depolarizers, the compound customarily is mixed with a carbon black, preferably one with a high surface area. In general the cathodic mix, which includes the organic compound, the carbon and an electrolyte, may contain from about 10 to 50% of the organic benzofuroxan type depolarizer. Cathodic mixes containing the benzofuroxans were used in assembling test batteries by conventional means. In general, the testing procedure involves discharging the prepared batteries through a closed circuit through a 150 ohm and/or a 4 ohm resistor, measuring the voltage periodically until the predetermined voltage cut-off point is reached. Benzofuroxan cathodic mixes may be used in batteries having zinc, magnesium or magnesium alloy anodes with satisfactory results.

It is not intended that the foregoing discussion be taken to imply that the ultimate in depolarizers has been found or that all members of the series are equally useful for all purposes. There is still some variation in their optimum applicability. Nevertheless, compounds of this series are more universal in application than previously used materials.

For example, among the variables in optimum use, certain members of the series are preferred in certain types of cells and under certain discharge conditions. In magnesium anode cells at slow drain (150 ohm) and at fast drain (4 ohm) conditions, benzofuroxan per se shows the best results. Especially is this true as to higher initial voltages and flatter discharge curves. In zinc anode cells, benzotrifuroxan is preferred for best results under both slow and fast drain conditions, especially as to initial voltage and flat discharge curves.

However, for certain special requirements other compounds of the series may be preferred. Thus, in a zinc cell under slow drain conditions, 4-nitrobenzofuroxan would be a preferred material for the flattest discharge curve possible even though the initial voltage is not quite as high as when using benzotrifuroxan. For general purposes, benzofuroxan itself is especially useful, both because of its desirable properties and for economic reasons. It may be prepared from relatively inexpensive and readily-available materials. Detailed comparisons of the various members of the series under different discharge conditions are shown in the illustrative examples (below).

Benzofuroxan derivatives containing the furoxan heterocyclic ring, which class of compound has never been disclosed as depolarizers for patteries, may be conveniently prepared by a number of methods. Starting materials for preparation of the benzofuroxans include o-nitro amino derivatives; o-quinones; o-quinonedioxime and the like. Thus, o-nitro-anilines may be converted to furoxans by oxidation of the o-nitro amino compound with oxidizing agents such as hypohalites such as sodium hypochlorite; or with phenyliodoso acetate, etc.; or o-nitro-anilines may be diazotized by conventional means using sodium nitrite. Treatment of the diazonium compound with sodium azide gives the o-nitro azide derivative which upon heating is converted to the benzofuroxan derivative; or an o-quinonedioxime may be oxidized to the benzofuroxan.

By using appropriate substituents such as alkoxy groups, alkyl groups, etc., on the benzo ring in the starting materials, desired substituted benzofuroxans may also be prepared by the above method. In addition, various nitro derivatives may be prepared from the benzofuroxan derivatives obtainable by the above methods using various conventional nitration conditions.

Preparation of a number of typical compounds of the series of the present invention is shown in the following Examples 1–11. Therein all parts and percentages are by weight and temperatures are in degrees centigrade unless otherwise noted. Thereafter illustrative examples are given of the preparation and testing of dry cells, using the furoxan derivatives of this invention.

EXAMPLE 1

*Preparation of Benzofuroxan*

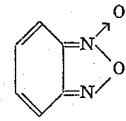

To a solution of 56 g. of o-nitro-aniline in 150 ml. of water and 90 ml. concentrated hydrochloric acid at 0–5° C. is added gradually a solution of 29 g. of sodium nitrite in 100 ml. of water. After stirring and filtering the mixture, 26 g. of sodium azide ($NaN_3$) in 100 ml. of water is added gradually; the intermediate product is removed by filtration and dried and then converted to the benzofuroxan by heating (up to about 16 hours) at steam bath temperatures. The product may be purified by sublimation at atmospheric pressure on the steam bath or by recrystallization from a chloroform-hexane mixture giving a product melting at 73° C.

EXAMPLE 2

*Preparation of 5-Nitrobenzofuroxan*

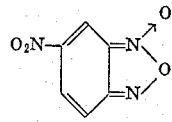

A solution of 5 g. of 2,4-dinitro-aniline in 40 ml. of glacial acetic acid and 20 ml. of concentrated sulfuric acid at 0–5° C. is prepared. To this solution solid sodium nitrite is added until the solution becomes clear. It is then filtered and excess nitrous acid present in the filtrate is decomposed by the addition of urea. Sodium azide is then added until precipitation is complete and the intermediate azide derivative is removed by filtration and dried. It is converted to 5-nitrobenzofuroxan by heating at steam bath temperatures for about two hours (until nitrogen ceases to be evolved). After recrystallization from hot ethanol, a product is obtained with a melting point of 72–73° C.

EXAMPLE 3

*Preparation of 5-Methylbenzofuroxan*

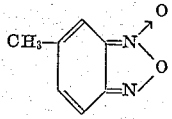

A solution of 20 g. of m-nitro-p-toluidine (2-nitro-4-methyl-aniline) in 150 ml. of saturated alcoholic sodium hydroxide solution is prepared. To it is added gradually 10–15% sodium hypochlorite solution until the red color changes to yellow. The precipitated product is removed by filtration, washed with water and recrystallized from ethanol giving a product with a melting point of about 98° C.

EXAMPLE 4

Preparation of 5-Methoxybenzofuroxan

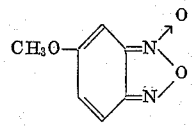

The procedure of Example 3 is followed except that an equivalent amount of 3-nitro-4-aminoanisole is used in place of m-nitro-p-toluidine. The product is recrystallized from ethanol giving a melting point of 118–119° C.

EXAMPLE 5

Preparation of 4-Nitrobenzofuroxan

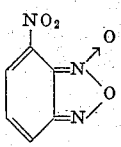

Maintaining the temperature between 5 and 15° C. during the addition, 1.7 g. of sodium nitrate in a minimum of concentrated sulfuric acid is added to a solution of 2.72 g. of benzofuroxan in a minimum of cold concentrated sulfuric acid. After the mixture is allowed to stand for a short period, it is drowned in ice and the solid material is removed by filtration and purified by recrystallization from hot glacial acetic acid giving a product with a melting point of 142.5 to 144.5° C. A similar product is obtained if the procedure above is repeated except that 90% nitric acid is used in place of the sodium nitrate.

EXAMPLE 6

Preparation of 4,6-Dinitrobenzofuroxan

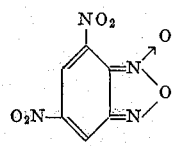

Picryl azide (prepared from sodium azide and picryl chloride) is heated in xylene (or acetic acid) at the reflux temperature until nitrogen ceases to be evolved. After cooling the product which precipitates is removed by filtration and recrystallized from glacial acetic acid.

ALTERNATIVE NITRATION PROCEDURE (A)

To a solution of 10 g. of benzofuroxan in 120 g. of concentrated hydrochloric acid is added with cooling a mixture of 15 ml. of nitric acid (density equal to 1.5) in 40 ml. of concentrated sulfuric acid. After warming to 40° C., the mixture is drowned in water and the resulting precipitated 4,6-dinitrobenzofuroxan is removed by filtration and recrystallized from glacial acetic acid giving a product with a melting point of 172° C.

ALTERNATIVE NITRATION PROCEDURE (B)

Boron trifluoride gas is passed into a solution of 13 ml. of nitrogen tetroxide in 50 ml. of dry nitro methane until the solution becomes saturated as evidenced by the evolution of white $BF_3$ fumes (preparation of boron trifluoride nitrogen tetroxide complex). To this solution is added gradually 2 g. of benzofuroxan in nitro methane and the mixture is heated at the reflux temperature about 16 hours. The solution is filtered hot and then concentrated by evaporation to about ⅓ its original volume. On cooling the 4,6-dinitro product separates as crystalline material and is removed by filtration. This may be recrystallized from methanol with a melting point of 172.6° C.

EXAMPLE 7

Preparation of 5,6-Dinitrobenzenefuroxan

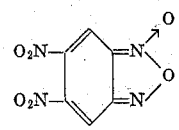

The procedure described above in Example 5 using 90% nitric acid is repeated using 5-nitrobenzofuroxan in place of benzofuroxan. The product is recrystallized from benzene-hexane mixture with a melting point of 172° C.

EXAMPLE 8

Preparation of 5-Methyl-4-Nitrobenzofuroxan

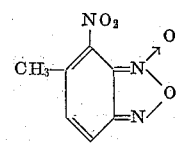

The procedure described above in Example 5 is followed except that 1.5 g. of 5-methylbenzofuroxan is used with 0.85 g. of sodium nitrate. The product is purified by recrystallization from glacial acetic acid giving a melting point of 164° C.

EXAMPLE 9

Preparation of 5-Methyl-4,6-Dinitrobenzofuroxan

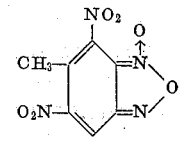

The procedure used above in Example 5 is followed except that an excess of nitric acid is used (density of 1.5). The crude product melts at 130–133° C.

EXAMPLE 10

Preparation of 5-Methoxy-4-Nitrobenzofuroxan

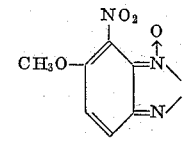

The procedure of Example 5 is followed using 0.42 g. of nitric acid (density 1.5) for each gram of 5-methoxybenzofuroxan used in place of benzofuroxan. The product is recrystallized from ethanol giving a melting point of 160° C.

The procedure of Example 6 (using the boron trifluoride nitrogen tetroxide complex) is repeated except that an amount of 5-methoxybenzofuroxan is used as a starting material and chloroform is used as a solvent in place of the nitromethane. The product is purified by recrystallization from an acetone-hexane mixture.

EXAMPLE 11

Preparation of Benzotrifuroxan

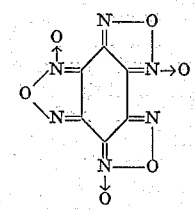

2 g. of triazidotrinitrobenzene (prepared by reaction of symmetrical trichlorotrinitrobenzene with sodium azide) is dissolved in 10 ml. of propionic acid. The mixture is heated at 110–115° C. until the solution is complete and then at 135 and 145° C. for short periods at each temperature (5 minutes each). 20 ml. of water is added at 60° C. and after the mixture is allowed to stand overnight, the solid material is removed by filtration and dried having a melting point of 193–194° C.

*Preparation of Batteries*

"AA" size dry cells were made using as cathodic depolarizers compounds of this invention. In this type of cell, a cathode material is prepared weighing approximately 5 to 6½ g. using the depolarizer, carbon black and electrolyte. A typical illustrative formulation includes the following:

|  | Grams |
|---|---|
| Benzofuroxan (or other depolarizer) | 1.06 |
| Columbian carbon black (HR 1670 P3317) | 1.33 |
| BaCrO$_4$ | 0.06 |
| MgBr$_2$ (aq.), 500 grams/l. MgBr$_2$·6H$_2$O–1.0 gram/l. K$_2$CrO$_4$ | 3.28 |
|  | 5.73 |

Using these cathodic mixes, cells are prepared with magnesium and with zinc anode cans using customary techniques. An illustrative procedure may be described as follows:

(*a*) The cathode components are mixed to a coherent paste and inserted into an anode metal can lined with salt-free kraft paper. (*b*) A carbon collector electrode with brass cap is inserted concentrically into the cell with a top washer. (*c*) The cell is sealed with wax.

TESTING PROCEDURE

In the following examples, the testing procedure used involved the discharge of so-prepared cells through a closed circuit; through a 150 ohm resistor to test slow drain, or a 4 ohm resistor to simulate fast drain conditions, measuring the voltage periodically. The results may be plotted as curves showing operating voltage against time. Typical curves are shown in the attached. The useful energy delivered by a battery, i.e., all energy from a cell operating to at least the cut-off point, may be calculated by integrating the area under the curve for $E^2/R$ plotted as a function of time.

For comparison and evaluation of the results of these discharge tests, the initial operating voltage and the elapsed discharge time required for the voltage to drop to the predetermined cut-off point are determined. These figures give a measure of the dry cell performance. A combination of a high initial voltage with a flat discharge curve or a long time interval to a voltage drop to the cut-off point indicates the relative merits. Such discharge tests and the results thereof, using cathodic mixes comprising the compounds of the invention are shown in the following examples. The relative superiority of the compounds of the invention as depolarizers is readily seen therefrom.

EXAMPLE 12

To illustrate the use of the present invention in magnesium anode cells under fast discharge conditions a series of magnesium anode cells was prepared according to the procedure outlined above. They were tested according to the outlined procedure, determining the initial voltage and the time of continuous discharge to a 0.9 volt cut-off, under fast drain conditions (4 ohms). For purposes of comparison a number of cells using as depolarizing agents MnO$_2$ (as in a standard Leclanché cell) and various benzofuroxans of the present invention were made and tested. Illustrative results are shown in the following Table I.

TABLE I

| Depolarizer Compound | Initial Voltage | Time to 0.9 volt [1] |
|---|---|---|
| Benzofuroxan | 1.45 | 87 |
| 4-nitro-benzofuroxan | 1.41 | 76 |
| 4,6-dinitro-benzofuroxan | 1.6 | 58 |
| MnO$_2$ | 1.22 | 22 |

[1] Minutes.

In the accompanying FIGURE 1 is shown illustrative continuous discharge curves for two compounds of Table I. Curve A shows the result using benzofuroxan. Curve B shows the results with 4,6-dinitrobenzofuroxan. Curve A shows the energy output of a cell of 25 watt hours per pound to a 0.9 volt cut-off. From these curves it will be seen that the highest initial voltage is not necessarily accompanied by the flattest discharge rate but that the overall performance was excellent in both cases. The marked superiority over an MnO$_2$ Leclanché cell is clearly shown in Table I.

EXAMPLE 13

To illustrate the results obtainable in zinc anode cells under fast drain conditions, Example 12 was repeated using a series of zinc anode cells. Illustrative results are shown in the following Table II.

TABLE II

| Depolarizer Compound | Initial Voltage | Time to 0.9 volt [1] |
|---|---|---|
| Benzofuroxan | 0.93 | 18 |
| 4,6-dinitro-benzofuroxan | 0.97 | 25 |
| Benzotrifuroxan | 1.11 | 33 |
| Do | 1.22 | 29 |

[1] Minutes.

Figure 2:
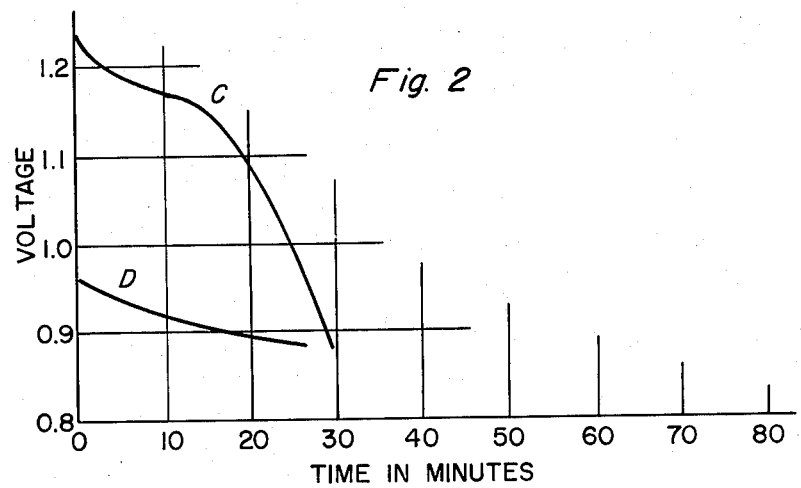

The accompanying FIGURE 2 shows the resultant curves for two of these compounds, curve C for benzotrifuroxan and curve D for benzofuroxan. Curve C describes a cell having an energy output of 5 watt hours per pound to a 0.9 volt cut-off.

EXAMPLE 14

To illustrate the results obtainable under slow drain conditions, the procedure of Example 12 was repeated using magnesium anodes but discharging through a 150 ohm resistor. Illustrative results are shown in the following Table III.

TABLE III

| Depolarizer Compound | Initial Voltage | Hours to 0.9 volt | Hours to 0.75 volt |
|---|---|---|---|
| Benzofuroxan | 1.49 | 105 | |
| 5-NO$_2$-benzofuroxan | 1.23 | 35 | 62 |

EXAMPLE 15

Example 13 was repeated except that discharge was through 150 ohms. Illustrative results are shown in Table IV.

TABLE IV

| Depolarizer Compound | Initial Voltage | Hours to 0.9 volt | Hours to 0.75 volt |
|---|---|---|---|
| Benzofuroxan | 1.09 | 50 | 141 |
| 5-methoxy-benzofuroxan | 1.13 | 42 | 81 |
| 4-nitro-benzofuroxan | 1.06 | 121 | 158 |
| 5-nitro-benzofuroxan | 1.14 | 41 | 83 |
| 5-methoxy-4-nitro-benzofuroxan | 1.05 | 70 | 109 |
| 4,6-dinitro-benzofuroxan | 1.17 | 58 | 71 |
| 5,6-dinitro-benzofuroxan | 1.15 | 24 | 22 |
| 5-methyl-4,6-dinitro-benzofuroxan | 1.05 | 35 | 95 |
| Benzotrifuroxan | 1.44 | 67 | 101 |
| m-Dinitrobenzene | .75 | | |

Figure 3:
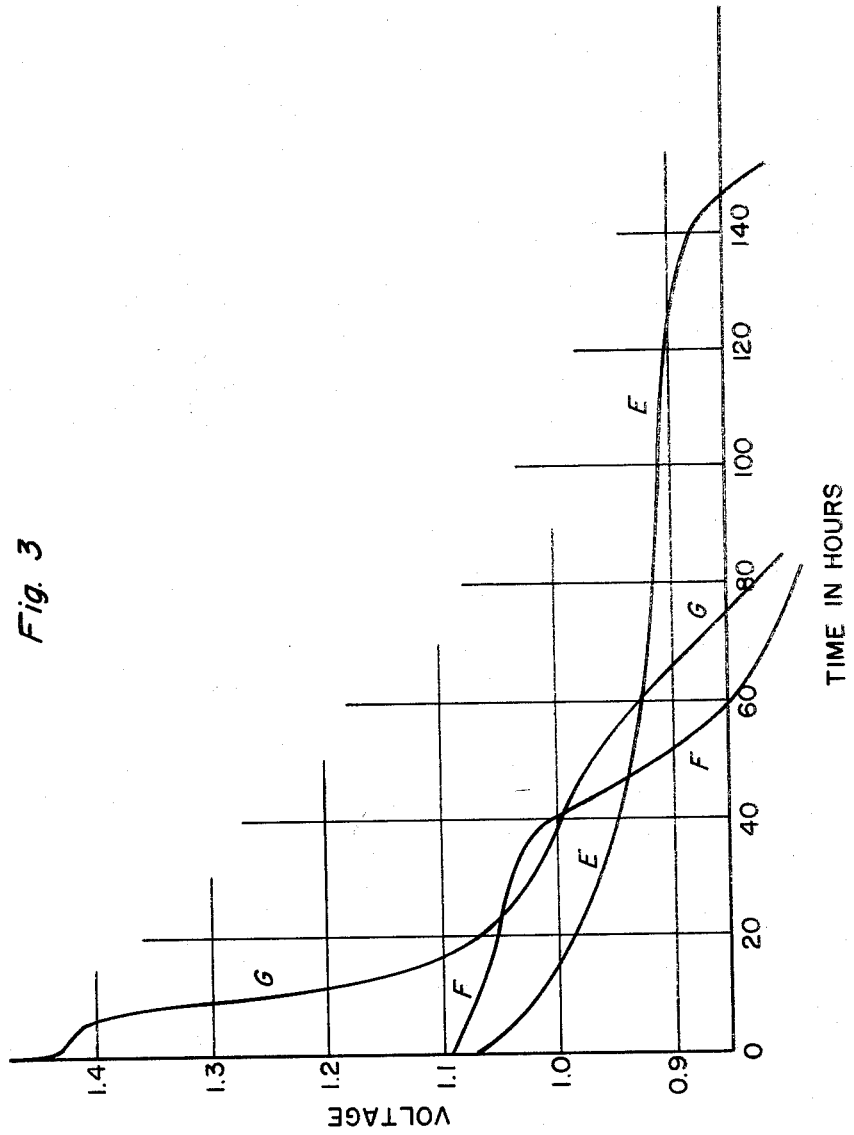

In the accompanying FIGURE 3, curves for the testing of three of these compounds are shown. Curve E is for 4-nitrobenzofuroxan; curve F for benzofuroxan and curve G for benzotrifuroxan. The test on a cell using m-dinitrobenzene, one of the best known of previously-used organic depolarizers, shows that under the test conditions the initial voltage was well below the cut-off value. Curve E describes a cell having an energy output of 25-watt hours per pound to a 0.9 volt cut-off.

We claim:
1. In a dry cell comprising in combination an anode of a highly electro-positive metal and a cathode composition comprising a mixture of carbon and a depolarizer compound, the improvement in which said depolarizer compound is selected from the group consisting of the benzofuroxan compounds represented by the formulae

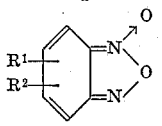

(I)

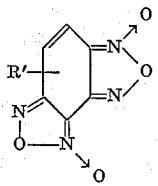

(II)

and

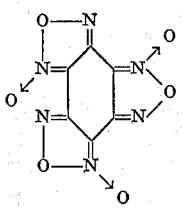

(III)

wherein $R^1$ and $R^2$ are selected from the group consisting of hydrogen, lower alkyl, lower alkoxy, chloro and nitro radicals.

2. A cell according to claim 1 in which the anode is zinc and the depolarizer compound is benzofuroxan.
3. A cell according to claim 1 in which the anode is zinc and the depolarizer compound is 4-nitrobenzofuroxan.
4. A cell according to claim 1 in which the anode is zinc and the depolarizer compound is benzotrifuroxan.
5. A cell according to claim 1 in which the anode is zinc and the depolarizer compound is 5-nitrobenzofuroxan.
6. A cell according to claim 1 in which the anode is magnesium and the depolarizer compound is benzofuroxan.
7. A cell according to claim 1 in which the anode is magnesium and the depolarizer compound is 4,6-dinitrobenzofuroxan.
8. A cell according to claim 1 in which the anode is zinc and the depolarizer compound is 5-methoxy-4-nitrobenzofuroxan.

References Cited in the file of this patent

UNITED STATES PATENTS 2,880,122    Morehouse et al. _____ Mar. 31, 1959

OTHER REFERENCES

Patterson et al.: (The Ring Index, 2nd edition), published by the American Chemical Society (Washington, D.C.), 1960 (pages 194 and 281 are relied upon).